(12) United States Patent
Yoshida et al.

(10) Patent No.: US 10,072,523 B2
(45) Date of Patent: Sep. 11, 2018

(54) SHEET-METAL TURBINE HOUSING

(71) Applicant: MITSUBISHI HEAVY INDUSTRIES, LTD., Tokyo (JP)

(72) Inventors: Toyotaka Yoshida, Tokyo (JP); Takao Yokoyama, Tokyo (JP); Isao Tomita, Tokyo (JP); Daigo Watanabe, Tokyo (JP); Yasuaki Jinnai, Tokyo (JP); Hirotaka Higashimori, Nagasaki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 272 days.

(21) Appl. No.: 15/024,659

(22) PCT Filed: Dec. 4, 2013

(86) PCT No.: PCT/JP2013/082555
§ 371 (c)(1),
(2) Date: Mar. 24, 2016

(87) PCT Pub. No.: WO2015/083252
PCT Pub. Date: Jun. 11, 2015

(65) Prior Publication Data
US 2016/0273388 A1    Sep. 22, 2016

(51) Int. Cl.
*F01D 25/24* (2006.01)
*F01D 9/02* (2006.01)
(Continued)

(52) U.S. Cl.
CPC ............ *F01D 25/246* (2013.01); *F01D 9/02* (2013.01); *F01D 9/026* (2013.01); *F01D 25/08* (2013.01);
(Continued)

(58) Field of Classification Search
CPC .......... F01D 25/246; F01D 25/08; F01D 9/02; F01D 9/026; F01D 21/045; F02B 37/00;
(Continued)

(56) References Cited

U.S. PATENT DOCUMENTS 2,480,860 A    9/1949 Hunt
9,261,109 B2 *  2/2016 Maeda ................... F01D 9/026
(Continued)

FOREIGN PATENT DOCUMENTS

CN    200978710 Y    11/2007
JP    62-40232 U     3/1987
(Continued)

OTHER PUBLICATIONS

Written Opinion of the International Searching Authority and International Search Report (forms PCT/ISA/237, PCT/ISA/210 and PCT/ISA220), dated Feb. 4, 2014, for International Application No. PCT/JP2013/082555.
(Continued)

*Primary Examiner* — Timothy L Maust
(74) *Attorney, Agent, or Firm* — Birch, Stewart, Kolasch & Birch, LLP

(57) ABSTRACT

An object is to provide a sheet-metal turbine housing reinforced by a readily-manufacturable structure, the sheet-metal turbine housing also having a small thickness and improved containment performance. A sheet-metal turbine housing includes: a scroll part forming an exhaust gas channel of a scroll shape in a turbocharger for driving a turbine with exhaust gas of an engine, the scroll part comprising sheet metal; and at least one rib portion of a protrusion shape formed on an outer wall surface of the scroll part at a radially outer side of an inlet edge of a turbine blade along a circumferential direction of the scroll part, the at least one rib portion protruding either outward or inward,
(Continued)

or both, and including a bend and bend-back structure formed on the sheet metal forming the scroll part.

7 Claims, 9 Drawing Sheets

(51) Int. Cl.
    *F01D 25/08*     (2006.01)
    *F02B 37/00*     (2006.01)
    *F01D 21/04*     (2006.01)

(52) U.S. Cl.
    CPC ............ *F02B 37/00* (2013.01); *F01D 21/045* (2013.01); *F05D 2220/40* (2013.01); *F05D 2230/54* (2013.01); *F05D 2250/61* (2013.01); *F05D 2260/22141* (2013.01); *F05D 2300/10* (2013.01); *F05D 2300/5023* (2013.01); *F05D 2300/518* (2013.01); *F05D 2300/603* (2013.01); *Y02T 10/144* (2013.01)

(58) Field of Classification Search
    CPC ............. F05D 2220/40; F05D 2230/54; F05D 2250/61
    USPC ......................................................... 415/206
    See application file for complete search history.

(56) References Cited

U.S. PATENT DOCUMENTS

| | | | | |
|---|---|---|---|---|
| 9,404,509 | B2 * | 8/2016 | Isogai | F01D 9/026 |
| 9,657,573 | B2 * | 5/2017 | Higashimori | F01D 5/048 |
| 9,702,266 | B2 * | 7/2017 | Celaya | F01D 25/14 |
| 9,810,225 | B2 * | 11/2017 | Yokoyama | F01D 9/026 |

FOREIGN PATENT DOCUMENTS

| | | | |
|---|---|---|---|
| JP | 2001-107722 | A | 4/2001 |
| JP | 2002-295287 | A | 10/2002 |
| JP | 2004-183651 | A | 7/2004 |
| JP | 2006-161573 | A | 6/2006 |
| JP | 2006-161579 | A | 6/2006 |
| JP | 2007-2791 | A | 1/2007 |
| JP | 2007-120396 | A | 5/2007 |
| JP | 2008-196452 | A | 8/2008 |
| JP | 2008-202467 | A | 9/2008 |
| JP | 4269184 | B2 | 5/2009 |
| JP | 2010-116868 | A | 5/2010 |
| JP | 2011-106303 | A | 6/2011 |
| JP | 2011-174460 | A | 9/2011 |
| JP | 2011-179370 | A | 9/2011 |
| JP | 2012-211544 | A | 11/2012 |
| WO | WO 2011/104596 | A2 | 9/2011 |

OTHER PUBLICATIONS

International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2013/082555, together with an English translation thereof.
Office Action dated May 17, 2017 issued to the corresponding CN Application No. 201380079575.0 with an English Translation.
Decision to Grant a Patent dated Dec. 2, 2016, issued in the corresponding JP Application No. 2015-551330 with an English Translation.
Extended European Search Report dated Nov. 14, 2016 issued in the corresponding EP Application No. 13898527.0.
Office Action effective Mar. 23, 2018 issued to the corresponding EP Application No. 13898527.0.
Office Action effective Jun. 22, 2018 issued to the corresponding CN Application No. 201380079575.0 with a Machine Translation.

* cited by examiner

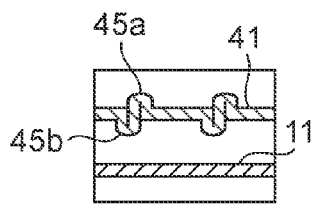
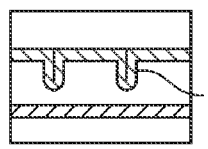
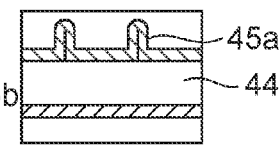
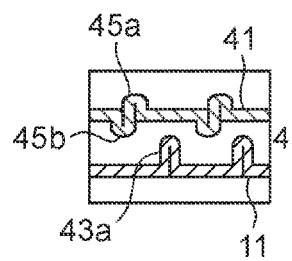
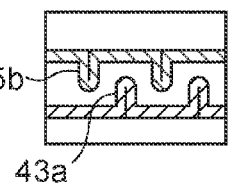
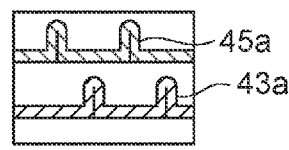
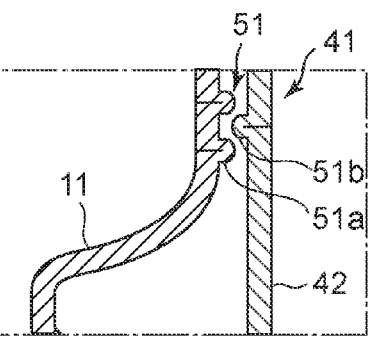
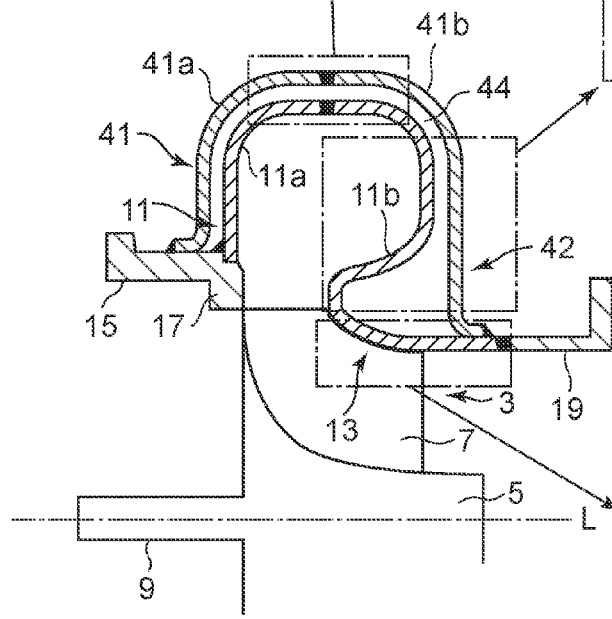
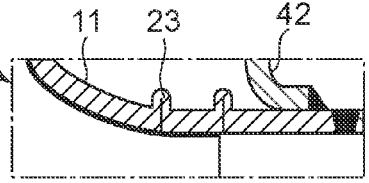

SHEET-METAL TURBINE HOUSING

TECHNICAL FIELD

The present invention relates to a sheet-metal turbine housing used for an exhaust turbocharger configured to be driven by exhaust gas of an engine to generate a boost pressure. It especially relates to a (containment) technique to prevent scatter of fragments in response to burst of a turbine rotor.

BACKGROUND ART

Conventional turbine housings for turbochargers are normally produced by casting, and thus designed taking account of a flow of liquid metal, which leads to an increase in the thickness of the entire housing and to a high heat capacity.

Thus, when an engine is started, the heat quantity of gas flowing through a turbine is absorbed by a turbine housing and the temperature of the gas decreases, which negatively affects a temperature increase of a medium at the downstream of the turbine. Accordingly, in recent years, sheet-metal turbine housings made of plate have been increasingly brought into use to reduce heat capacity of turbine housings.

Using a sheet-metal turbine housing results in a reduced thickness and thus in reduced heat capacity, and in addition, provides a smoother surface, which makes it possible to reduce friction loss and flow loss of exhaust gas, as compared to a casted turbine housing.

On the other hand, using sheet metal reduces strength of a structural body. Thus, to secure containment performance in response to burst of a rotor, for instance, it is necessary to take some measure, such as to increase the thickness of a housing. However, increasing the thickness contradicts the effect to reduce the heat capacity.

Patent Document 1 (JP2012-211544A), Patent Document 2 (JP2006-161573A), and Patent Document 3 (JP4269184B), for example, disclose a technique related to a sheet-metal turbine housing or a technique for ensuring containment performance in response to burst of a rotor.

Patent Document 1 discloses a sheet-metal turbine housing including a protector disposed along a scroll direction on an outer peripheral section of a scroll part and on an outer side in a radial direction of a rotation shaft of a turbine rotor, the protector being fixed to the scroll part.

Further, Patent Document 2 discloses a sheet-metal turbine housing of a double-tube structure, including a scroll part forming a scroll-shaped exhaust-gas channel and a cover part covering the scroll part via a predetermined adiabatic space.

Still further, Patent Document 3 discloses a double-shell shaped turbine housing including a housing of a scroll shape formed of sheet metal and an exterior shell surrounding the housing via a gap.

CITATION LIST

Patent Literature

Patent Document 1: JP2012-211544A
Patent Document 2: JP2006-161573A
Patent Document 3: JP4269184B

SUMMARY

Problems to be Solved

However, in Patent Document 1, the sheet-metal turbine housing is reinforced by attaching the protector, which is a separate member, onto the outer side of the scroll part along the scroll direction by welding, thus resulting in more man hours required for attachment. Further, while Patent Documents 2 and 3 disclose providing a double-shell structure to improve containment performance, a double structure and an increased thickness may lead to a weight increase.

In view of this, an object of the present invention is to provide a sheet-metal turbine housing reinforced by a readily-manufacturable structure, the sheet-metal turbine housing also having a small thickness and improved containment performance.

Solution to the Problems

The present invention was made to achieve the above object, and a sheet-metal turbine housing comprises: a scroll part forming an exhaust gas channel of a scroll shape in a turbocharger for driving a turbine with exhaust gas of an engine, the scroll part comprising a sheet metal; and at least one rib portion of a protrusion shape formed on an outer wall surface of the scroll part at a radially outer side of an inlet edge of a turbine blade along a circumferential direction of the scroll part, the at least one rib portion protruding either outward or inward, or both, and including a bend and bend-back structure formed on the sheet metal forming the scroll part.

According to the present invention, at least one rib portion of a protrusion shape protruding either outward or inward, or both, is formed on the outer wall surface of the scroll part at the radially outer side of the inlet edge of the turbine blade along the circumferential direction, which makes it possible to reinforce the sheet-metal turbine housing without attaching a separate member. As a result, it is possible to enhance structure strength and improve containment performance while maintaining a reduced heat capacity and avoiding a weight increase due to an increased thickness.

Further, since the rib portion comprises the bend and bend-back structure formed on the sheet metal forming the scroll part, it is possible to produce the rib portion of a protrusion shape by only bending the sheet metal (including bending back). As a result, the manufacture process is facilitated as compared to a structure with a separate member attached by welding or the like, thus resulting in less manufacture man hours.

Further, in an embodiment of the present invention, the sheet-metal turbine housing further comprises: a shroud part of a turbine housing, the shroud part comprising sheet metal and covering an outer peripheral edge of the turbine blade via a gap; and at least one rib portion formed on an outer wall surface of the shroud part.

Also with the shroud part of the turbine housing facing the outer peripheral edge of the turbine blade with a gap, it is possible to enhance structure strength and improve containment performance while maintaining a reduced heat capacity without bringing about a weight increase due to an increased thickness. In response to burst of a rotor, fragments scatter in a turning-radius direction of rotation of the turbine. Thus, providing the shroud part disposed in the turning-radius direction with a reinforcement structure is effective in improving containment performance of the sheet-metal turbine housing.

Further, in an embodiment of the present invention, a reinforcement member is wrapped by the at least one rib portion so as to be housed inside a bend and bend-back portion forming the at least one rib portion.

As described above, with the bend and bend-back portion constituting the rib portion wrapped around a reinforcement member, such as a band and a wire, so as to house the reinforcement member, the strength of the rib portion improves even further.

Further, in an embodiment of the present invention, the at least one rib portion comprises a plurality of rib portions disposed in a plurality of rows in an axial direction of the turbine on the outer wall surface of the scroll part or the shroud part, the rib portions determining a position at which a reinforcement member is to be wound around.

As described above, the rib portions are used as stoppers for determining position, and the reinforcement member is wound between the rib portions so that the reinforcement member, such as a band and a wire, can be disposed on a certain position without being displaced, which makes it possible to enhance strength at a certain position. Further, since the original reinforcement by the rib portions and the reinforcement by a reinforcement member, such as a wire and a band, are combined, improved reinforcement can be achieved.

Further, in an embodiment of the present invention, the scroll part has a dual structure comprising an inner scroll part and an outer scroll part, and the at least one rib portion is formed only on the outer scroll part.

Accordingly, the scroll part has a dual structure comprising an inner scroll part and an outer scroll part, and the at least one rib portion is formed only on the outer scroll part. Thus, the wall surface of the exhaust-gas channel formed inside the inner scroll part has no protrusion-shaped rib portion. Thus, there is no flow-channel resistance, and an effect to reduce flow loss of exhaust gas is maintained, the effect being achieved by a smooth surface provided by using sheet metal.

Further, it is possible to achieve reinforcement with the rib portion on the outer scroll part without attaching a separate member, which makes it possible to enhance structure strength and improve containment performance while maintaining a reduced heat capacity without bringing about a weight increase due to an increased thickness.

Further, in an embodiment of the present invention, the at least one rib portion formed on the outer scroll part comprises a hook portion cut and raised from an outer wall surface of the outer scroll part and bended back, and a wire serving as a reinforcement member is wrapped and held inside the hook portion.

If the inner scroll part has a leak-proof structure, making a cut in the outer scroll part raises no problem in terms of sealing performance. Thus, the hook portion can be formed to have the cut-and-raised portion and the bend-back portion on the outer wall surface of the outer scroll part by making a cut so that the wire, a reinforcement member, is wrapped inside the hook portion, which makes it possible to form the rib portion with a simplified structure and to reinforce the outer scroll part.

Further, in an embodiment of the present invention, the scroll part has a dual structure comprising an inner scroll part and an outer scroll part, and the at least one rib portion comprises rib portions formed in a protrusion shape on both of the inner scroll part and the outer scroll part, the rib portion on the outer scroll part projecting inward only, or both inward and outward, and the rib portion on the inner scroll part projecting outward only.

As described above, the scroll part has a dual structure comprising an inner scroll part and an outer scroll part, and the at least one rib portion comprises rib portions formed in a protrusion shape on both of the inner scroll part and the outer scroll part, the rib portion on the outer scroll part projecting inward only, or both inward and outward, and the rib portion on the inner scroll part projecting outward only.

In other words, with the rib structure disposed in a space between the inner scroll part and the outer scroll part, the rib portions can contract within this space to absorb impact energy, which makes it possible to further enhance strength and improve containment performance.

Further, in an embodiment of the present invention, the shroud part has a dual structure comprising an inner shroud part and an outer shroud part, and the at least one rib portion is formed only on the outer shroud part.

Accordingly, the shroud part has a dual structure including the inner shroud part and the outer shroud part, and the at least one rib portion is formed only on the outer shroud part. Thus, the wall surface of the exhaust-gas channel formed by the inner scroll part has no protrusion-shaped rib portion. Thus, an effect to reduce flow loss of exhaust gas is maintained, the effect being achieved by a smooth surface provided by using sheet metal.

Advantageous Effects

According to the present invention, it is possible to provide a sheet-metal turbine housing that is readily manufacturable, and to enhance structure strength and improve containment performance without bringing about a weight increase due to an increased thickness.

BRIEF DESCRIPTION OF DRAWINGS

FIG. 1A is a partial cross-sectional view of a sheet-metal turbine housing. FIG. 1B is a schematic view of a rib portion of a scroll outer-peripheral part. FIG. 1C is a schematic view of a rib portion of a shroud part.

FIGS. 8A to 8C illustrate the third embodiment. FIG. 8A is a partial cross-sectional view of a sheet-metal turbine housing. FIGS. 8B to 8G are each a schematic view of a rib portion of a scroll outer-peripheral part. FIG. 8H is a schematic view of a rib portion of a scroll side-wall part. FIG. 8I is a schematic view of a rib portion of a shroud part.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
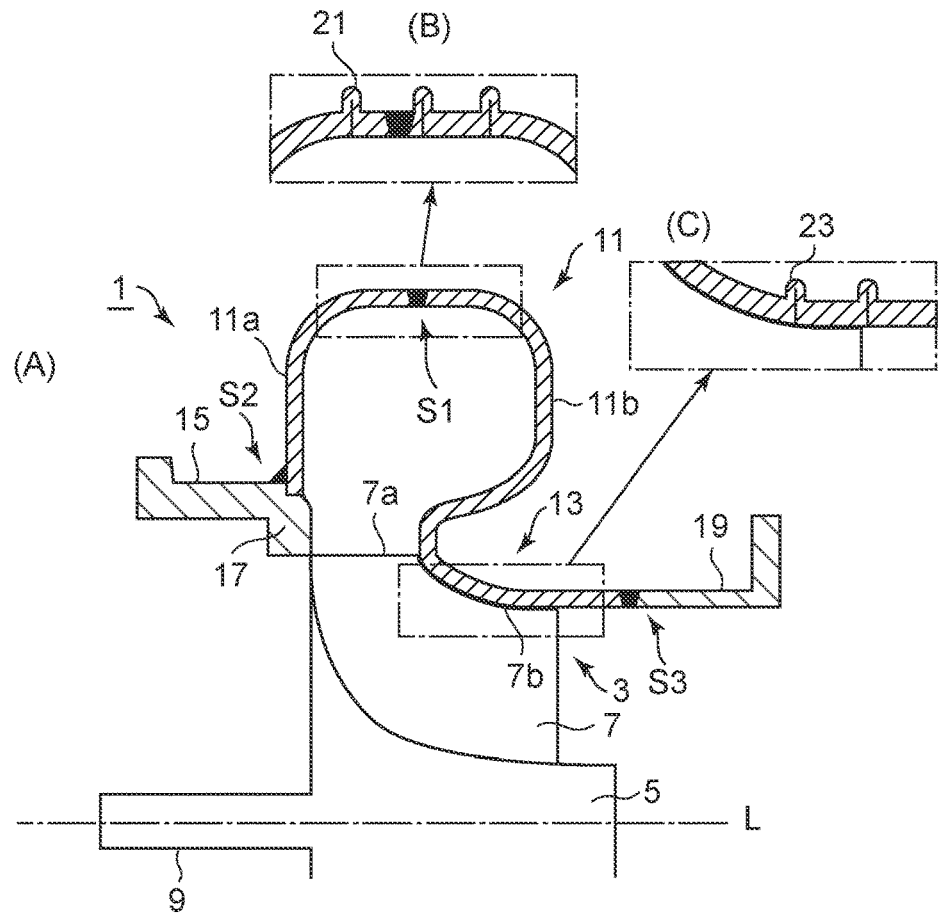
FIGS. 1A to 1C illustrate the first embodiment of the present invention.

With reference to FIG. 1, a sheet-metal turbine housing according to the first embodiment of the present invention will now be described.

The turbine housing 1 is to be incorporated into an exhaust turbocharger to be mounted to an engine, and a turbine wheel 3 is housed inside the turbine housing 1. The turbine wheel 3 includes a hub part 5 and a plurality of turbine blades 7 implanted on the outer peripheral surface of the hub part 5. A turbine shaft 9 is coupled to the hub part 5. Further, the turbine shaft 9 is coupled to a compressor wheel (not illustrated). The turbine wheel 3 is configured to rotate about a rotational center axis L.

The turbine housing 1 includes a scroll part (inner scroll part) 11 housing the turbine wheel 3 and forming an exhaust channel of a scroll shape for guiding exhaust gas to an inlet edge 7a of the turbine blades 7 of the turbine wheel 3, and a shroud part 13 covering an outer peripheral edge 7b of the turbine blades 7 via a gap.

Further, an end of the scroll part 11 is joined by welding to a flange part 17 of the turbine housing 15, the flange part 17 being coupled to a bearing housing (not illustrated) housing a bearing which rotatably supports the turbine shaft 9, and the other end of the scroll part 11 is formed integrally up to the shroud part 13. Alternatively, the other end may be butted to or overlapped with the shroud part 13 to be joined by welding to the shroud part 13.

The scroll part 11 of a scroll shape includes the first scroll part 11a on the side of the bearing housing 15 and the second scroll part 11b on the side of the shroud. The first scroll part 11a and the second scroll part 11b are butted to each other, or overlapped with each other, so as to be joined at a matching part by welding S1 over the entire periphery in the circumferential direction of the scroll part, the welding being butt welding or overlap welding.

The first scroll part 11a and the second scroll part 11b are formed of sheet-metal members of a thin plate shape and shaped by pressing, the material of the sheet-metal members being heat-resistant steel plate, for example.

With regard to the turbine housing part 15 coupled to a bearing housing (not depicted), the end of the flange part 17 is joined with the end of the first scroll part 11a by welding S2, as described above. Further, to the end of the shroud part 13, an outlet tubular part 19 through which exhaust gas having flowed through the turbine wheel 3 is discharged is joined by welding S3.

Further, a plurality of rib portions (scroll rib portions) 21 of an outwardly-projecting protrusion shape is formed on an outer wall surface of the scroll part 11, the outer wall surface corresponding to an outer peripheral side of the inlet edge 7a of the turbine blades 7, along the circumferential direction of the scroll part 11 from the start to the end of the scroll shape. In an arrangement example, the scroll rib portions 21 are formed in three rows at regular intervals at the center in the width direction of the scroll part 11, as illustrated in FIG. 1B. The structure of the cross section will be described below specifically.

Further, also on the shroud part 13, a plurality of rib portions (shroud rib portions) 23 of an outwardly-projecting protrusion shape is similarly formed, along the circumferential direction of the shroud part 13 from the start to the end of the scroll shape, for instance in two rows in the circumferential direction, as illustrated in FIG. 1C.

Figure 19A:
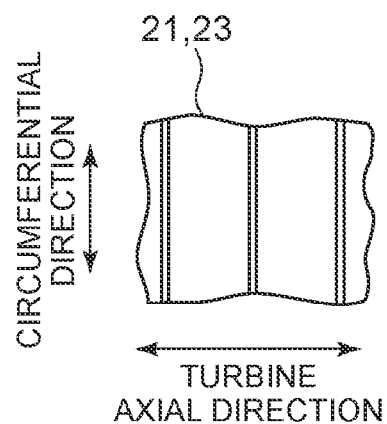
FIGS. 19A and 19B are schematic diagrams for explaining the direction in which the rib portions are arranged.
Figure 19B:
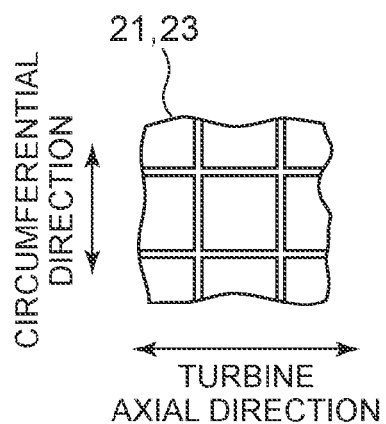

Further, whereas the scroll rib portions 21 in FIG. 19A extend in the circumferential direction of the scroll part 11, additional scroll rib portions 21 may be formed so as to extend in a turbine axial direction orthogonal to the circumferential direction, thereby forming a grid pattern, as illustrated in FIG. 19B.

The cross-sectional shapes of the scroll rib portions 21 and the shroud rib portions 23 are formed as specifically illustrated in FIGS. 2 to 5.

Figure 2:
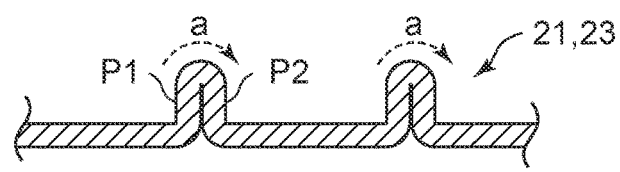
FIG. 2 is a cross-sectional view specifically illustrating a structure of the rib portion according to the first embodiment.

In FIG. 2, a sheet-metal member forming the scroll part 11 includes a bend portion P1 formed by pressing and a bend-back portion P2 formed by bending, so that the rib portions (scroll rib portions, shroud rib portions) 21, 23 project in a protrusion shape. Accordingly, the sheet metal is overlapped in a U-shape to form a rib portion.

Figure 3:
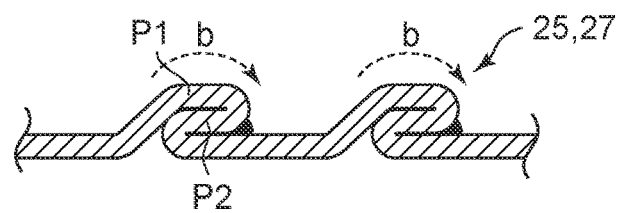
FIG. 3 is a cross-sectional view of a modified example of the rib portion depicted in FIG. 2.

In FIG. 3, the rib portions 25, 27 have a shape such that the rib portions 21, 23 formed in FIG. 2 are further bended in the direction of arrow "a" to overlap with the outer wall surface, and the overlapping part with the wall surface may be welded.

Figure 4:
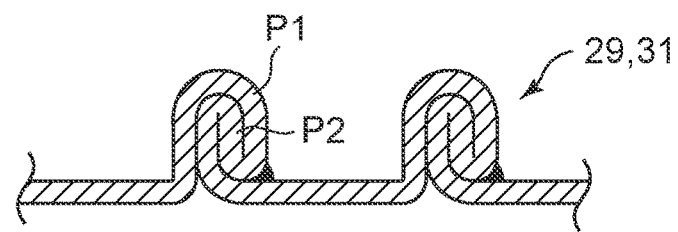
FIG. 4 is a cross-sectional view of a modified example of the rib portion depicted in FIG. 2.

In FIG. 4, the rib portions 29, 31 have a shape such that the rib portions 25, 27 formed in FIG. 3 are further bended in the direction of arrow "b" to overlap with the outer wall surface, and the overlapping part with the wall surface may be welded.

It will be understood that the structure strength of the rib portions is greater in FIG. 3 than in FIG. 2, and greater in FIG. 4 than in FIG. 3, with an improved reinforcement effect.

Figure 5:
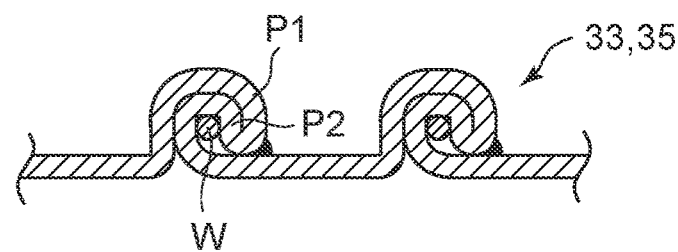
FIG. 5 is a cross-sectional view of a modified example of the rib portion depicted in FIG. 2.

Further, the rib portions 33, 35 in FIG. 5 are wrapped around a wire W, a reinforcement member, so as to house the wire W inside the bend-back portion P2 constituting the rib portions 29, 31 illustrated in FIG. 4. The reinforcement member is not limited to the wire W, and may be a band, for instance.

As described above, with the bend-back portion P2 constituting the rib portion 21 or the like wrapped around a reinforcement member, such as a band and the wire W, so as to house the reinforcement member, the strength of the rib portion improves even further.

According to the first embodiment, the plurality of rib portions 21 of an outwardly-projecting protrusion shape is formed on the outer wall surface of the scroll part 11, the outer wall surface corresponding to the inlet edge 7a of the turbine blades 7 of the turbine wheel 3, along the circumferential direction of the scroll part 11. Thus, it is possible to reinforce the sheet-metal turbine housing without attaching a separate member, which does not increase the thickness of the sheet metal and thus does not lead to a weight increase. As a result, it is possible to enhance structure strength and improve containment performance while maintaining a reduced heat capacity.

Further, with the plurality of rib portions 21 formed on the outer wall surface of the scroll part 11, the outer wall surface corresponding to the inlet edge 7a of the turbine blades 7, it is possible to effectively achieve reinforcement in a direction in which fragments of the turbine blades scatter in response to burst of the turbine rotor, without increasing the thickness of the turbine housing.

Further, since the rib portions 21, 23 of a protrusion shape can be produced by bending or bending back the sheet-metal members themselves constituting the scroll part 11 and the shroud part 13, it is possible to produce the rib portions 21, 23 by only bending the sheet-metal members. As a result, the manufacture process is facilitated as compared to a structure with a separate member attached by welding or the like, thus resulting in less manufacture man hours.

Second Embodiment

Figure 6:
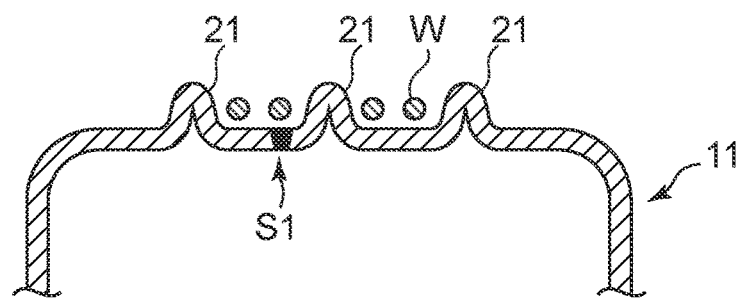
FIG. 6 is an explanatory diagram schematically illustrating a rib portion of a scroll outer-peripheral part according to the second embodiment.
Figure 7:
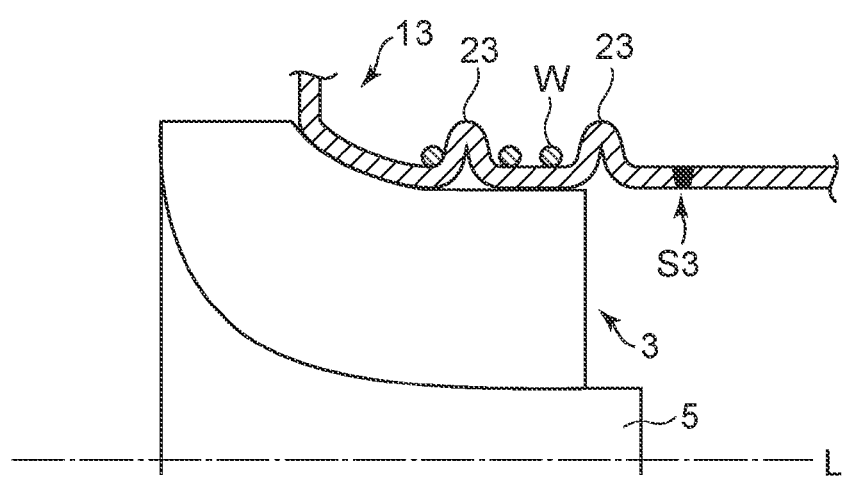
FIG. 7 is an explanatory diagram schematically illustrating a rib portion of a shroud part according to the second embodiment.

Next, the second embodiment will be described with reference to FIGS. 6 and 7.

In the second embodiment, the scroll rib portions 21 according to the first embodiment are disposed on the outer wall surface of the scroll part 11, or the shroud rib portions 23 are disposed on the outer wall surface of the shroud part 13, the scroll rib portions 21 and the shroud rib portions 23 being arranged in a plurality of rows in the axial direction of the turbine, so that the rib portions 21, 23 function as stoppers for determining the position of the reinforcement member to be wound around.

The rib portions 21, 23 are formed at intervals suitable for stoppers. In other words, the intervals are designed in accordance with the diameter of the wire W, the width of the band, or the number of windings, for instance, as illustrated in FIGS. 6 and 7. Further, the number of the rib portions 21, 23 may be set as needed.

As described above, the rib portions 21, 23 are used as stoppers for determining the position of the wire W or the band, and the reinforcement members is wound between the rib portions so that the reinforcement members can be disposed on a certain position without being displaced, which makes it possible to enhance strength at a certain position. Further, the reinforcement function intrinsically possessed by the rib portions 21, 23 and the reinforcement function provided by the wound-around reinforcement member, which is the wire W or band, are combined to achieve further reinforcement of the sheet-metal housing 1.

It should be noted that the wire W or the band may be wound around either one of, or both of, the outer peripheral wall surface of the scroll part 11 and the outer wall surface of the shroud part 13.

Third Embodiment

Next, with reference to FIGS. 8 to 18, the third embodiment will now be described.

In the third embodiment, the scroll part includes an inner scroll part 11 and an outer scroll part 41.

The inner scroll part 11 is the single scroll part described with reference to the first embodiment, and the outer scroll part 41 is formed outside the inner scroll part 11, thereby forming a dual scroll-part structure.

The inner scroll part 11 illustrated in FIG. 8A has the same configuration as that of the first embodiment and thus not described again.

The outer scroll part 41 is formed outside the inner scroll part 11 and in a shape that covers the inner scroll part 11 along the shape of the inner scroll part 11 via a space chamber 44.

The outer scroll part 41 has an end welded to the flange part 17 of the turbine housing 15 and the other end welded on the outer wall surface of the shroud part 13.

Further, the outer scroll part 41 may be formed as a single piece, or may be divided into the first scroll part 41a and the second scroll part 41b, the two members being butted or overlapped with each other to be joined by welding, similarly to the inner scroll part 11.

Rib portions (inner-scroll rib portions) 43 and rib portions (outer-scroll rib portions) 45 are disposed on the wall-surface portions of the inner-scroll part 11 and the outer scroll part 41, respectively, the wall surface portions being disposed on the radially outer side of the turbine wheel 3, along the circumferential direction of the scroll parts 11, 41 from the start to the end of the scroll. FIGS. 8B to 8G illustrate the arrangement example of the rib portions.

In FIGS. 8B to 8D, the inner scroll part 11 does not have a rib portion but has an inner circumferential surface of a sheet-metal member, and only the outer scroll part 41 has rib portions 45.

In FIG. 8B, rib portions 45a (outer rib portions) 45a and rib portions (inner rib portions) 45b are formed on the outer side and the inner side of the plate-shaped member of the outer scroll part 41, respectively.

With the rib portions 45a and the rib portions 45b respectively disposed on the outer side and the inner side of the plate-shaped member of the outer scroll part 41, a reinforcement effect is additionally achieved by the rib portions 45a and the rib portions 45b besides that of the dual structure of the scroll part, which further improves reinforcement in the radial direction, in which fragments of the turbine wheel 3 scatter.

Further, in FIGS. 8C and 8D, the rib portions 45a or the rib portions 45b are formed on one of the outer side or the inner side of the plate-shaped member of the outer scroll part 41. Although the rib portions are formed on only one side and thus the reinforcement performance is lower than that of the structure illustrated in FIG. 8B with rib portions formed on both sides, the manufacture is facilitated.

FIGS. 8E to 8G correspond to a configuration in which outer rib portions 43a are formed on the outer side of the inner scroll part 11 in addition to the configuration of FIGS. 8B to 8D.

As described above, with regard to the dual scroll structure including the inner scroll part 11 and the outer scroll part 41, FIGS. 8B to 8D illustrate the rib portions 45a, 45b formed only on the outer scroll part 41, while FIGS. 8E to 8G illustrate the rib portions 45a, 45b, 43a formed on both of the inner scroll part 11 and the outer scroll part 41, the rib portions formed on the inner scroll part 11 protruding only on the outer side.

Accordingly, the wall surface of the exhaust-gas channel formed inside the inner scroll part 11 has no protrusion-shaped rib portion. Thus, there is no flow-channel resistance, and an effect to reduce flow loss of exhaust gas is maintained, the effect being achieved by a smooth surface provided by using sheet metal.

Further, in FIGS. 8E and 8F, the rib portions 45a, 43a are disposed in a space between the inner scroll part 11 and the outer scroll part 41. Thus, the rib portions can contract within this space to absorb impact energy, which makes it possible to enhance strength and improve containment performance without increasing the thickness of the housing.

Next, the rib portions (side-wall rib portions) 51 formed on the side wall portions of the inner scroll part 11 and the outer scroll part 41 will be described.

As illustrated in FIG. 8H, a rib portion 51a is formed on the inner scroll part 11 and rib portions 51b are formed on the outer scroll part 41, inside the space chamber 44 between the respective side walls of the inner scroll part 11 and the outer scroll part 41 of the dual scroll structure.

The rib portions 51a, 51b can contract within this space chamber 44 to absorb impact energy, which makes it possible to enhance strength and improve containment performance without increasing the thickness of the sheet-metal housing 1.

Next, the rib portions of the shroud part 13 will be described.

As illustrated in FIG. 8I, the shroud part 13 is defined as an inner shroud part, and a section formed in an end region of the outer scroll part 41 is defined as an outer shroud part 42.

A plurality of protrusion-shaped rib portions (shroud rib portions) 23 is formed on a position closer to the turbine wheel 3 than a position where the outer shroud part 42 is welded to the upper surface of the inner shroud part 13 is. The shroud rib portions 23 are similar to those in the first embodiment.

Figure 18A:
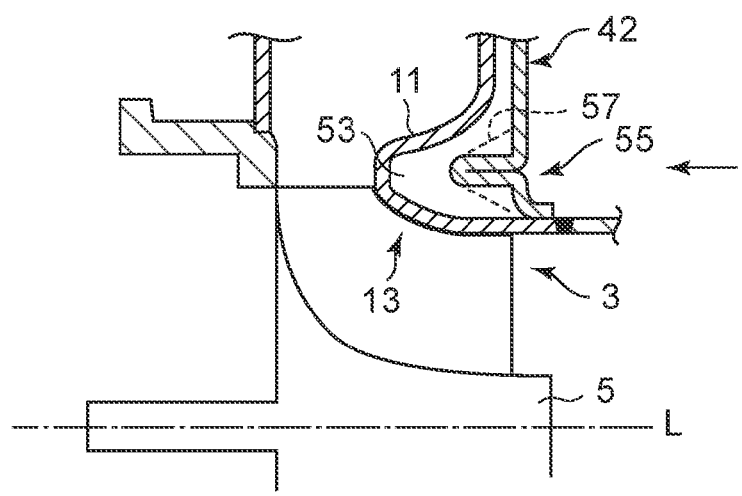
FIG. 18A is a schematic diagram of the rib portion formed on an outer scroll part to reinforce the shroud portion in the third embodiment.
Figure 18B:
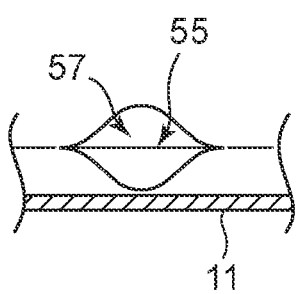
FIG. 18B is a schematic view of FIG. 18A as seen in the direction of arrow Z.

FIG. 18 illustrates another example of a reinforcement structure of the shroud part 13. A rib portion (outer-shroud rib portion) 55 is disposed on the outer shroud part 42 and formed in a U shape having a bended and bended-back structure, the rib portion 55 projecting toward the exhaust-gas-channel side of the inner scroll part 11 from the outer shroud part 42.

Further, as illustrated in FIG. 18, a plurality of dent portions 57 is formed at a plurality of positions on the outer shroud part 42 in the circumferential direction in which the rib portion 55 is formed, the dent portions 57 being dented toward the inner scroll part 11 in a direction of the rotational center axis L from the outer shroud part 42. With the dent portions 57 additionally provided, it is possible to improve stiffness and enhance strength, as compared to a case where only the rib portion 55 is simply formed by bending the outer shroud part 42.

Next, with reference to FIGS. 9 to 17, the cross-sectional shape of the scroll rib portions 43 (43a), 45 (45a, 45b), the side-wall rib portions 51, and the shroud rib portions 23 according to the third embodiment will be described specifically.

Figure 9:
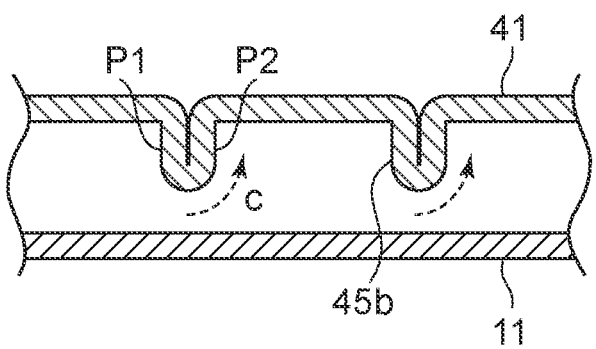
FIG. 9 is a cross-sectional view specifically illustrating a structure of the rib portion according to the third embodiment.

FIG. 9 illustrates rib portions projecting in a protrusion shape, which are the rib portions 45b formed on the outer scroll part 41 so as to include the bend portion P1 and the bend-back portion P2 described above with reference to FIG. 2 according to the first embodiment. In this example, no rib portion is formed on the inner scroll part 11.

Figure 10:
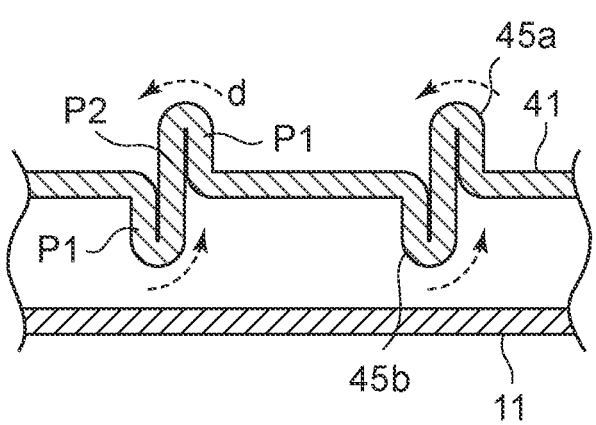
FIG. 10 is a cross-sectional view of a modified example of the rib portion depicted in FIG. 9.

FIG. 10 illustrates an example of the rib portions 45a, 45b projecting in a protrusion shape from both of the outer side and the inner side, the rib portions being formed respectively on the outer side and the inner side of the outer scroll part 41, the rib portions 45a, 45b being formed by bending at the bend portion P1 and the bend-back portion P2.

Figure 11:
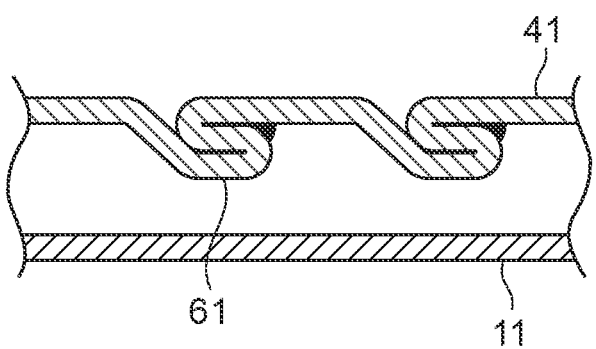
FIG. 11 is a cross-sectional view of a modified example of the rib portion depicted in FIG. 9.

The rib portions 61 in FIG. 11 are formed by bending the rib portions 45b in FIG. 9 in the direction of arrow "c".

Figure 12:
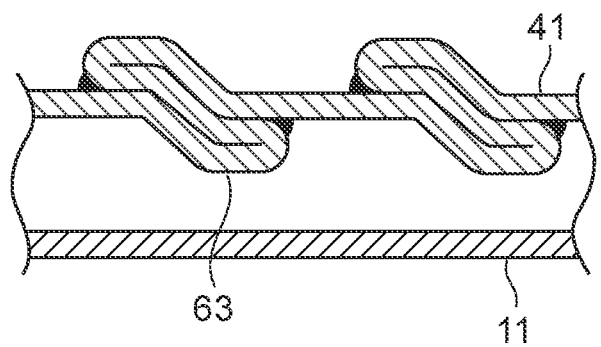
FIG. 12 is a cross-sectional view of a modified example of the rib portion depicted in FIG. 9.
Figure 13:
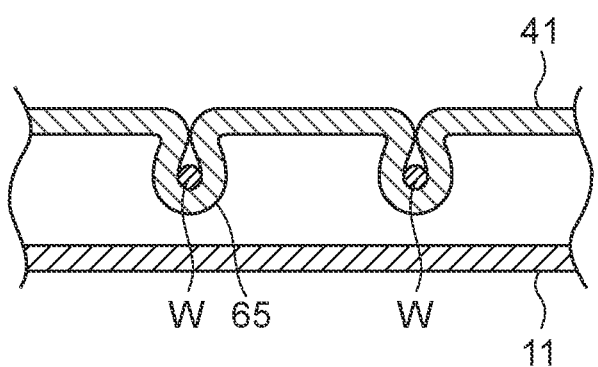
FIG. 13 is a cross-sectional view of a modified example of the rib portion depicted in FIG. 9.
Figure 14:
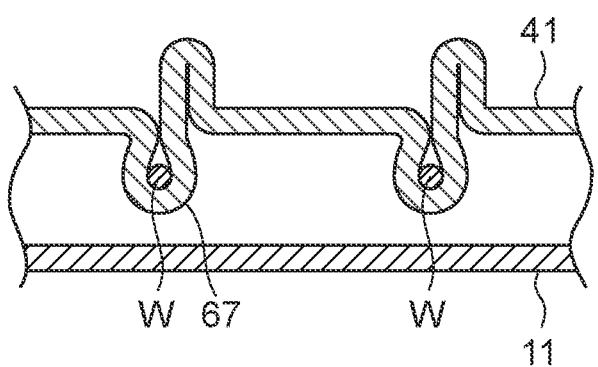
FIG. 14 is a cross-sectional view of a modified example of the rib portion depicted in FIG. 9.
Figure 15:
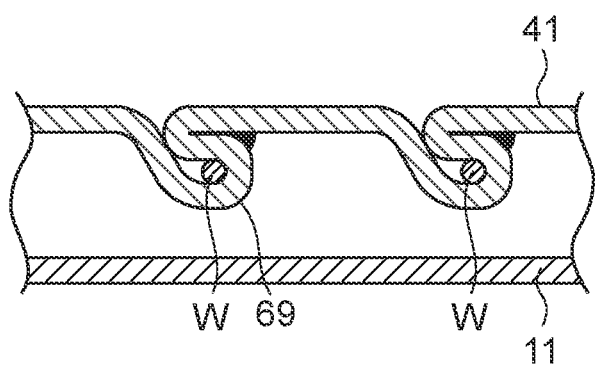
FIG. 15 is a cross-sectional view of a modified example of the rib portion depicted in FIG. 9.
Figure 16:
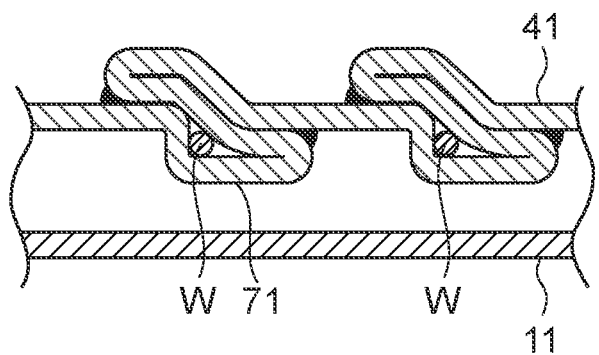
FIG. 16 is a cross-sectional view of a modified example of the rib portion depicted in FIG. 9.

Similarly, the rib portions 63 in FIG. 12 are formed by bending the rib portions 45a, 45b in FIG. 10 in the direction of arrow "d".

The rib portions 65, 67, 69, 71 respectively depicted in FIGS. 13 to 16 have shapes corresponding to the rib portions 45b, 45a, 45b, 61, 63 in FIGS. 9 to 12, and formed by wrapping the wire W, a reinforcement member, so as to house the wire W inside the bend-back portion P2 of the rib portion, similarly to the description of FIG. 5 corresponding to the first embodiment. The reinforcement member is not limited to the wire W, and may be a band or the like.

As described above, with the bend portion P1 and the bend-back portion P2 constituting the rib portion wrapped around a reinforcement member, such as a band or the wire W, so as to house the reinforcement member, the strength of the rib portion improves even further.

Figure 17A:
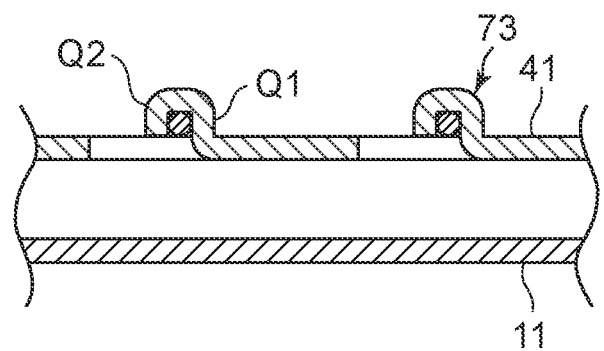
FIG. 17A is a cross-sectional view of a modified example of the rib portion depicted in FIG. 9.
Figure 17B:
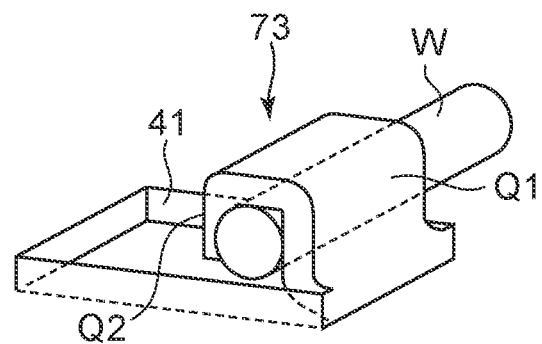
FIG. 17B is a perspective explanatory diagram.

FIG. 17 illustrates a rib portion 73 formed on the outer scroll part 41, the rib portion 73 including a hook portion 73 including a cut-and-raised portion Q1 and a bend-back portion Q2 formed on the outer wall surface of the outer peripheral side of the outer scroll part 41, the hook portion 73 wrapping the wire W, a reinforcement member, and holding the wire W inside the hook portion 73.

If the inner scroll part 11 has a leak-proof structure, making a cut in the outer scroll part 41 raises no problem in terms of sealing performance. Thus, the hook portion 73 can be formed to have the cut-and-raised portion Q1 and the bend-back portion Q2 on the wall surface on the outer peripheral side of the outer scroll part 41 by making a cut so as to wrap the wire W, a reinforcement member, inside the hook portion 73, which makes it possible to form the rib portion 73 with a simplified structure and to reinforce the outer scroll part 41.

INDUSTRIAL APPLICABILITY

According to the present invention, it is possible to provide a sheet-metal turbine housing reinforced by a readily-manufacturable structure, the sheet-metal turbine housing also having a small thickness and improved containment performance. Thus, the present invention can be suitably applied to a sheet-metal turbine housing for an exhaust turbocharger.

DESCRIPTION OF REFERENCE NUMERAL

1 Turbine housing (sheet-metal turbine housing)
3 Turbine wheel (turbine)
5 Hub part
7 Turbine blade
7a Inlet edge
7b Outer peripheral edge
9 Turbine shaft
11 Scroll part (inner scroll part)
11a First scroll part
11b Second scroll part
13 Shroud part (inner shroud part)
15 Turbine housing
21, 25, 29, 33, 4, 45, 61, 63, 65, 67, 69, 71 scroll rib portion (rib portion)
23, 27, 31, 35 Shroud rib portion (rib portion)
41 Outer scroll part
42 Outer shroud part 43 Inner scroll rib portion (rib portion)
45 Outer scroll rib portion (rib portion)
45a Outer rib portion
45b Inner rib portion
51 Side-wall rib portion (rib portion)
55 Outer shroud rib portion (rib portion)
73 Hook portion
W Wire (reinforcement member)

The invention claimed is:

1. A sheet-metal turbine housing, comprising:
   a scroll part forming an exhaust gas channel of a scroll shape in a turbocharger for driving a turbine with exhaust gas of an engine, the scroll part comprising sheet metal;
   at least one rib portion of a protrusion shape formed on an outer wall surface of the scroll part at a radially outer side of an inlet edge of a turbine blade along a circumferential direction of the scroll part, the at least one rib portion protruding either outward or inward, or both, and including a bend and bend-back structure formed on the sheet metal forming the scroll part;
   a shroud part of a turbine housing, the shroud part comprising sheet metal, covering an outer peripheral edge of the turbine blade via a gap, and including at least one rib portion formed on an outer wall surface of the shroud part.

2. The sheet-metal turbine housing according to claim 1, further comprising
   a reinforcement member wrapped by the at least one rib portion so as to be housed inside a bend and bend-back portion forming the at least one rib portion.

3. The sheet-metal turbine housing according to claim 1, wherein the at least one rib portion comprises a plurality of rib portions disposed in a plurality of rows in an axial direction of the turbine on the outer wall surface of the scroll part and on the outer wall surface of the shroud part, the rib portions determining a position at which a reinforcement member is to be wound around.

4. The sheet-metal turbine housing according to claim 1, wherein the scroll part has a dual structure comprising an inner scroll part and an outer scroll part, and the at least one rib portion is formed only on the outer scroll part.

5. The sheet-metal turbine housing according to claim 4, wherein the at least one rib portion formed on the outer scroll part comprises a hook portion cut and raised from an outer wall surface of the outer scroll part and bended back, and a wire serving as a reinforcement member is wrapped and held inside the hook portion.

6. The sheet-metal turbine housing according to claim 1, wherein the scroll part has a dual structure comprising an inner scroll part and an outer scroll part, and
   wherein the at least one rib portion comprises rib portions formed in a protrusion shape on both of the inner scroll part and the outer scroll part, the rib portion on the outer scroll part projecting inward only, or both inward and outward, and the rib portion on the inner scroll part projecting outward only.

7. The sheet-metal turbine housing according to claim 1, wherein the shroud part has a dual structure comprising an inner shroud part and an outer shroud part, and the at least one rib portion is formed only on the outer shroud part.

* * * * *